(12) United States Patent
Witty et al.

(10) Patent No.: US 6,782,097 B2
(45) Date of Patent: Aug. 24, 2004

(54) SPLITTER DEVICE FOR MDU/MTU ENVIRONMENTS

(75) Inventors: Amy J. Witty, Prior Lake, MN (US); Jason Piehl, Apple Valley, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 382 days.

(21) Appl. No.: 09/945,148

(22) Filed: Aug. 31, 2001

(65) Prior Publication Data

US 2003/0043997 A1 Mar. 6, 2003

(51) Int. Cl.[7] .............................. H04M 1/00; H04M 5/00
(52) U.S. Cl. .................. 379/399.01; 379/326; 379/327; 379/330; 379/333; 379/334; 379/413.02
(58) Field of Search ........................ 379/399.01, 413.04, 379/93.05, 325, 326, 327, 328, 330, 331, 332, 333, 334; 361/741, 730, 797, 796, 788, 802

(56) References Cited

U.S. PATENT DOCUMENTS

| | | | | |
|---|---|---|---|---|
| 4,975,072 A | * | 12/1990 | Afshar ........................ | 439/131 |
| 5,889,850 A | * | 3/1999 | Sochacki ..................... | 379/329 |
| 5,999,621 A | * | 12/1999 | Martin et al. ................ | 379/438 |
| 6,069,797 A | * | 5/2000 | Widmayer et al. .......... | 361/760 |
| 6,333,981 B1 | * | 12/2001 | Weir et al. ................... | 379/325 |
| 6,438,226 B1 | * | 8/2002 | Guenther et al. ........ | 379/413.04 |

OTHER PUBLICATIONS

Application Ser. No. 09/549,133, filed Apr. 13, 2000.
"BroadWire™ 120: High Density ADSL Splitter", *ADC Telecommunications, Inc.*, 8 pages (Sep. 2000).
"BroadWire™ 240: High Density ADSL Splitter", *ADC Telecommunications, Inc.*, 8 pages (Sep. 2000).
"BroadWire™ 528: High Density ADSL Splitter", *ADC Telecommunications, Inc.*, 8 pages (Sep. 2000).
"DSL POTS Splitter Shelf Family", *Corning Cable Systems LLC*, 8 pages (Sep. 2000).
"High Density xDSL Central Office Splitter: PS–1000 Series", *Wilcom*, 2 pages (Apr. 2000).
"Product Information for Multiple Dwelling Unit, ISDN", *ADC Telecommunications, Inc.*, 4 pages (Sep. 8, 2000).
"Product Information", *mPhase Technologies*, 3 pages (no date).
"Product Release: Wilcom Announces Highest Density CO ADSL POTS Splitter Series", *Wilcom*, 2 pages (Nov. 6, 2000).
"PS–1103 ADSL Central Office Line Filter Shelf: Quick Step Installation Instructions for PS–1103 Shelf", *Wilcom*, 2 pages (Jun. 2000).
"PS–1103 CO POTS Splitter: High Density xDSL Central Office Splitter", *Wilcom*, 2 pages (Jul. 2000, Nov. 2000).
ADC Telecommunications, Inc., "BroadWire™ 24–Port Front Access MDU ADSL Splitter Chassis Installation Guide", pp. 1–14 (Oct. 2000).
ADC Telecommunications, Inc., "BroadWire™ 24–Port Rear Access MDU ADSL Splitter Chassis Installation Guide", pp. 1–14 (Oct.2000).

* cited by examiner

*Primary Examiner*—Curtis Kuntz
*Assistant Examiner*—Tuan Pham
(74) *Attorney, Agent, or Firm*—Merchant & Gould P.C.

(57) ABSTRACT

A front access splitter assembly that fully supports lifeline POTS and lifeline ISDN (Integrated Services Digital Network) service requirements is shown and described in this disclosure.

20 Claims, 7 Drawing Sheets

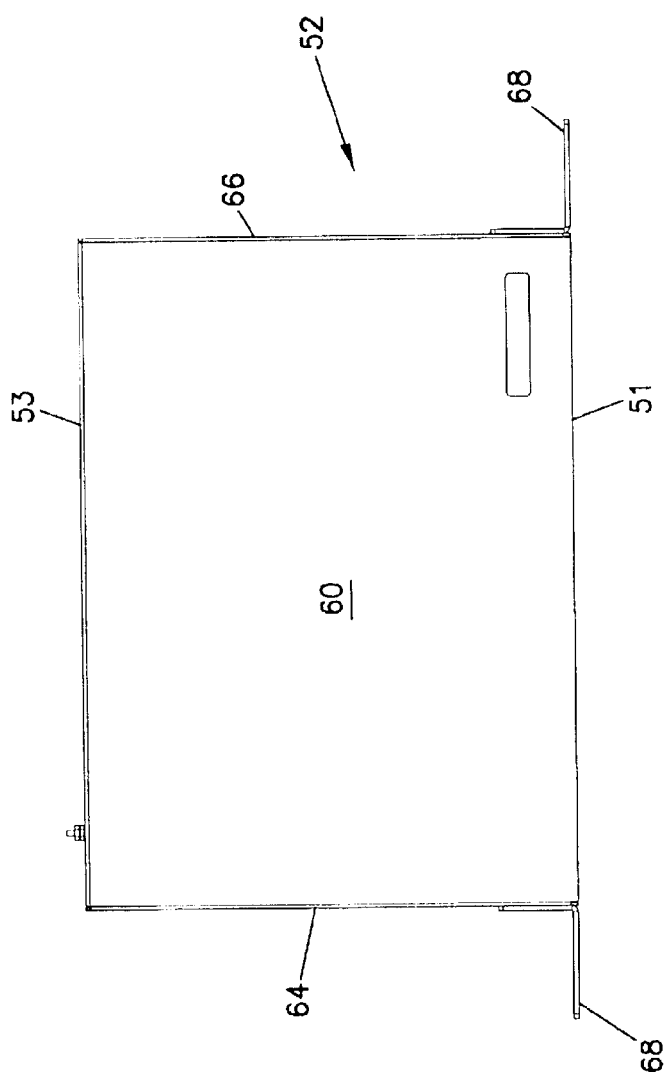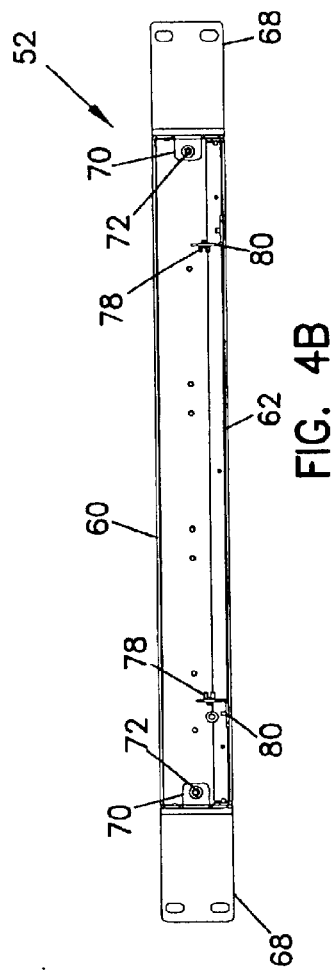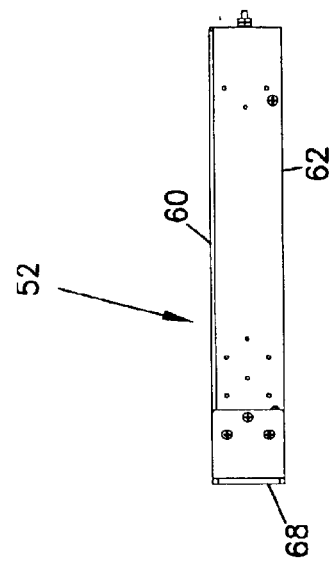

SPLITTER DEVICE FOR MDU/MTU ENVIRONMENTS

FIELD OF THE INVENTION

The present invention relates generally to telecommunications equipment. More particularly, the present invention relates to telecommunications equipment used in twisted pair telephone carrier systems.

BACKGROUND OF THE INVENTION

Telecommunications systems for transmitting voice and data to and from subscribers (i.e., residences and businesses) are known. An exemplary telecommunications system 10 is schematically shown in FIG. 1. The system 10 includes a Main Distribution Frame 12 (MDF) for connecting digital subscriber lines 13 (DSLs) to internal lines 14 within a telephone server's central office 15. The central office 15 frequently includes a DSLAM 18 (Digital Subscriber Line Access Multiplexer) and a voice switch 19. The DSLAM 18 transmits data to and receives data from a communications network/backbone 21. The voice switch 19 transmits voice signals to and receives voice signals from a communications network/backbone 23. The networks 21 and 23 can be dedicated lines that are part of the same network. POTS splitter devices 16 (i.e., Plain Old Telephone Service splitter devices) are used at the central office 15 to combine data signals from the DSLAM 18 with voice signals from the voice switch 19. By combining the signals, the signals can be simultaneously routed to a subscriber 25 through a single DSL 13. Signals transmitted from subscribers 25 to the central office 15 are also routed through the POTS splitter devices 16. At the POTS splitter devices 16, the signals are split and directed to the DSLAM 18 and the voice switch 19. Typically, the splitter devices 16 include low pass filters for removing the data content from any signals transmitted from the splitter devices 16 to the voice switch 19. Since DSLAMs 18 frequently include high pass filters for removing the voice band, the splitter devices 16 usually do not include filters for filtering the voice content from the signals transmitted to the DSLAM 18.

POTS splitter devices are also used at locations outside the central office environment. For example, splitter devices are often installed at multi-dwelling units (MDUS) such as apartments or condominiums. Splitter devices are also often installed at businesses or at multi-tenant units (MTUs) such as office buildings. FIG. 2 schematically illustrates an exemplary MDU/MTU 40. The MDU/MTU 40 has an equipment room 42 in which a DSLAM 18', a voice switch 19' and POTS splitter unit 16' are installed. The DSLAM 18' and the voice switch 19' respectively provide a data and voice interface with a central office 15'. The DSLAM 18' and the voice switch 19' also interface with the splitter unit 16'. From the splitter unit 16', separate DSLs are provided to different subscriber locations (e.g., different floors, offices, apartments, etc.) within the MDU/MTU 40.

SUMMARY OF THE INVENTION

One embodiment of the present invention relates to a front access splitter assembly that fully supports lifeline POTS and lifeline ISDN (Integrated Services Digital Network) service requirements.

A variety of other aspects of the invention are set forth in part in the description that follows, and in part will be apparent from the description, or may be learned by practicing the invention. The aspects of the invention relate to individual features as well as combinations of features. It is to be understood that both the foregoing general description and the following detailed description are exemplary and explanatory only and are not restrictive of the invention as claimed.

BRIEF DESCRIPTION OF THE DRAWINGS

FIG. 4A is a top view of the splitter chassis of the splitter unit of FIG. 3;

FIG. 4B is a front view of the chassis of FIG. 4A;

FIG. 4C is a side view of the chassis of FIG. 4A;

Figure 1:
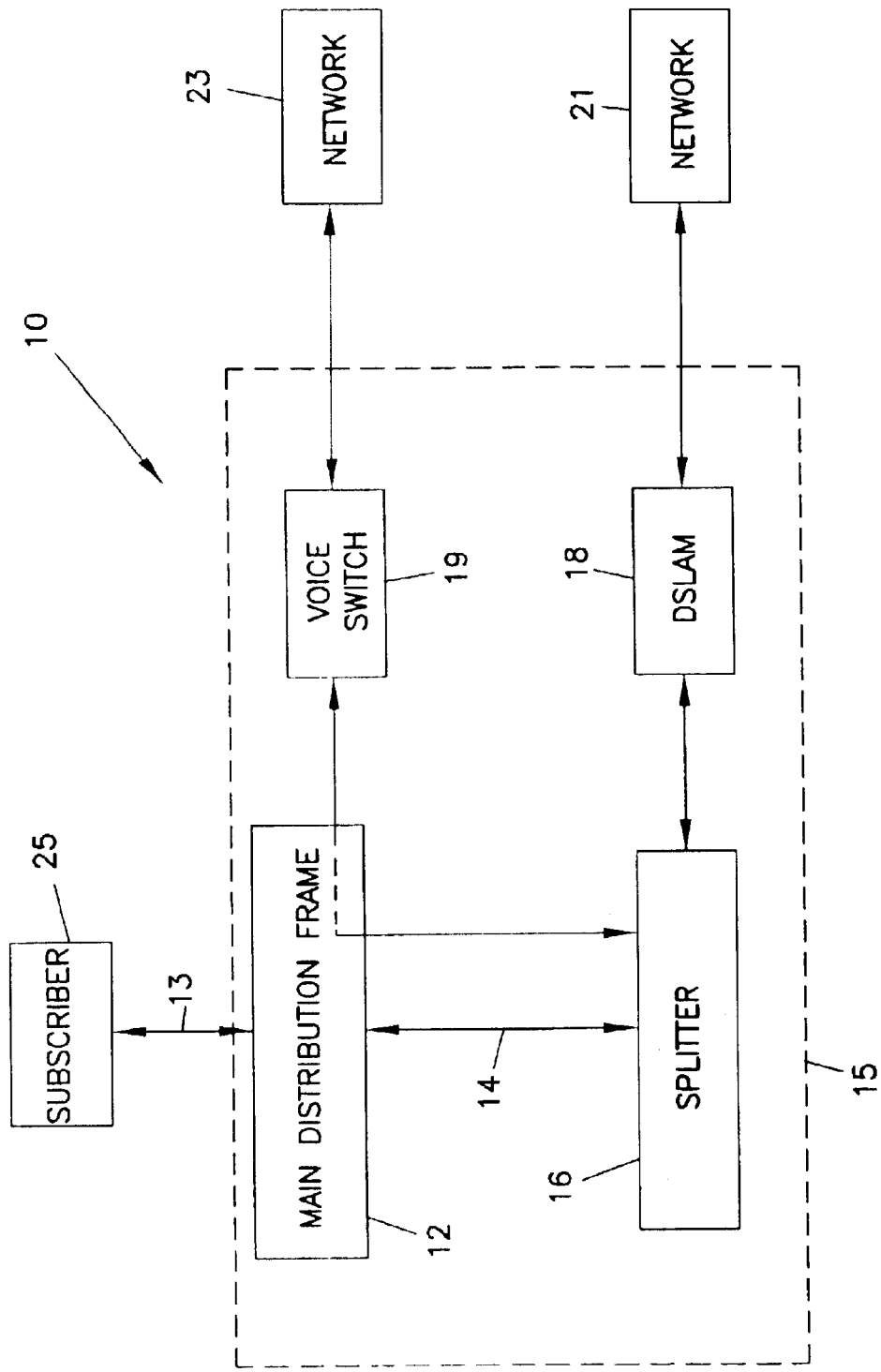
FIG. 1 is a diagram of a typical application of a telecommunications system including an MDF, a splitter device, a DSLAM, and a voice switch.

While the invention is amendable to various modifications and alternative forms, specifics thereof have been shown by way of example in the drawings and will be described in detail below. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION

In the following detailed description, references are made to the accompanying drawings that depict various embodiments in which the invention may be practiced. It is to be understood that other embodiments may be utilized, and structural and functional changes may be made without departing from the scope of the present invention.

It will be appreciated that the various aspects of the present invention are applicable to a variety of telecommunications service options including, among other things, ADSL (Asymmetric Digital Subscriber Line), IDSL (Integrated Services Digital Network DSL), SDSL (Symmetric DSL) and VDSL (very high speed DSL) services.

Figure 3:
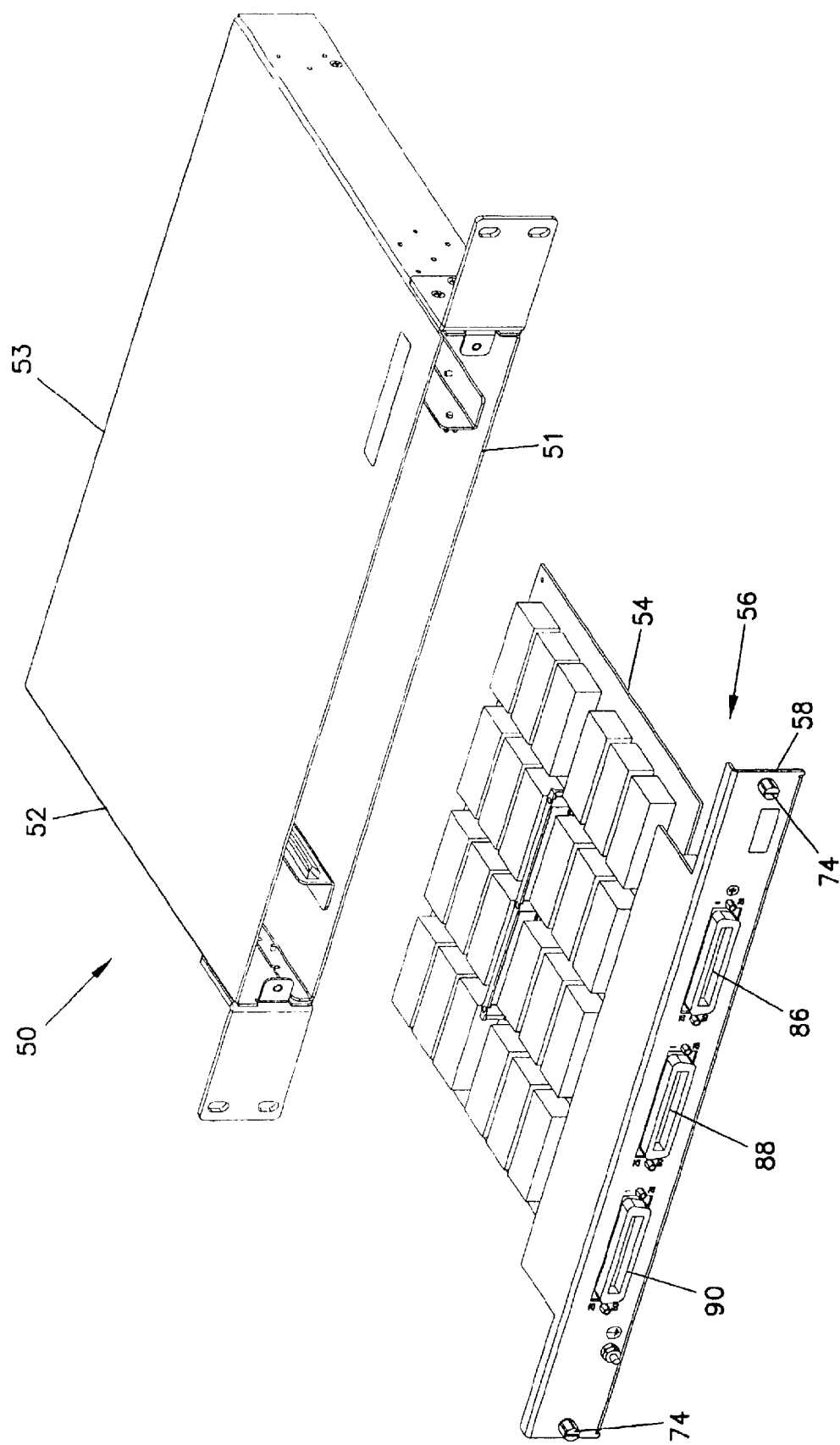
FIG. 3 is a perspective view of a splitter unit that is an embodiment of the present invention.

FIG. 3 illustrates a splitter unit 50 that is an embodiment of the present invention. The splitter unit 50 includes a chassis 52 having an open front end 51 positioned opposite from a closed back end 53. The open front end 51 defines a front access opening for allowing a splitter card 54 to be inserted into or removed from the chassis 52. The splitter unit 50 also includes a front interface assembly 56 that can be removably mounted at the front end 51 of the chassis 52.

The front interface assembly 56 is adapted to provide an electrical connection with the splitter card 54. The front interface assembly 56 includes a front panel 58 configured to at least partially cover or enclose the front end 51 of the chassis 52 when the front interface assembly 56 is mounted at the front end 51.

FIGS. 4A–4C show additional views of the chassis 52 of the splitter unit 50. As shown in these Figures, the chassis 52 is generally rectangular and includes opposing top and bottom walls 60 and 62, and opposing left and right walls 64 and 66. Mounting flanges 68 project outwardly from the left and right walls 64 and 66. The mounting flanges 68 are adapted for allowing the chassis 52 to be fastened to a conventional telecommunications cabinet or rack (e.g., by conventional fasteners such as bolts or screws). The chassis 52 also includes mounting tabs 70 that project inwardly from the left and right walls 64 and 66. The tabs 70 are located at the front end 51 of the chassis 52 and define fastener openings 72 for receiving fasteners 74 corresponding to the front interface assembly 56. The fastener openings 72 allow the front interface assembly 56 to be easily connected to and removed from the front end 51 of the chassis 52.

Referring to FIG. 4B, the chassis 52 defines an interior chamber for containing the splitter card 54. Opposing guide tracks 78 are located within the chamber 76. The guide tracks 78 are configured to receive left and right edges of the splitter card 54 such that the splitter card is held securely within the chamber 76. The guide tracks 78 are mounted on L-shaped brackets 80 mechanically coupled to the bottom wall 62 of the chassis 52. In the embodiment of FIG. 4B, only one pair of opposing guide tracks 78 is provided within the chamber 76 of the chassis 52. Thus, the chassis 52 is configured for receiving only a single splitter card. However, it will be appreciated that in alternative embodiments, multiple guide tracks can be provided to accommodate additional splitter cards.

In the embodiment of FIG. 4B, the opposing tracks 78 are elongated and extend continuously from adjacent the front end 51 of the chassis 52 to adjacent the back end 53 of the chassis 52. In alternative embodiments, intermittent guides or other types of structures for engaging the edges of the splitter card 54 could be used.

Figure 5C:
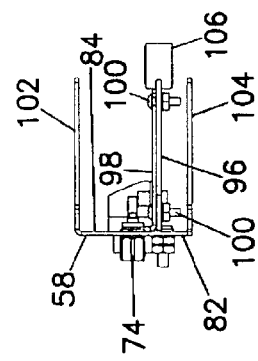
FIG. 5C is a side view of the front interface assembly of FIG. 5A.
Figure 5A:
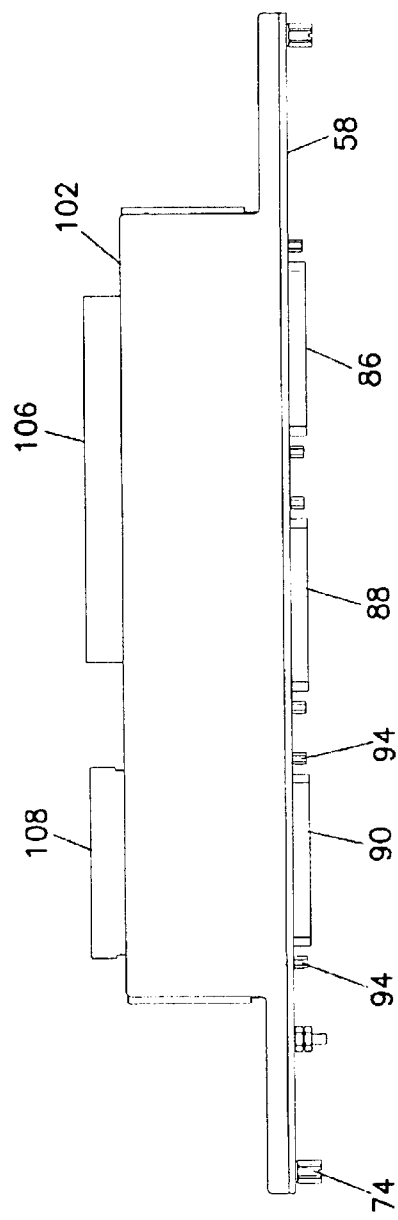
FIG. 5A is a top view of the front interface assembly of the splitter unit of FIG. 3.
Figure 5B:
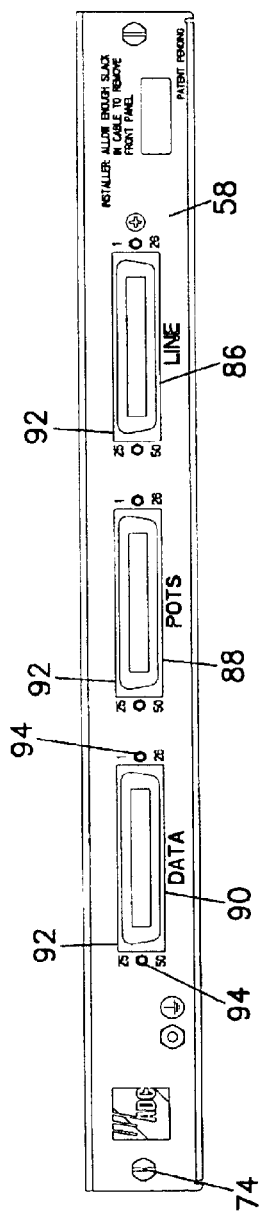
FIG. 5B is a front view of the front interface assembly of FIG. 5A.

Referring to FIGS. 5A–5C, the front interface assembly 56 is shown in isolation from the chassis 52. As shown, in FIG. 5C, the front panel 58 of the front interface assembly 56 includes a front side 82 positioned opposite from a back side 84. When mounted on the chassis 52, the back side 84 faces toward the chassis 52 and the front side 82 faces away from the chassis 52. As best shown in FIGS. 5A and 5B, LINE connectors 86, POTS connectors 88 and DATA connectors 90 are mounted at the front panel 58. For example, the connectors 86, 88 and 90 are shown mounted within rectangular openings 92 defined through the front panel 58. Fasteners 94 (e.g., fasteners such as screws or bolts) mechanically couple the connectors 86, 88 and 90 to the front panel 58. In a non-limiting embodiment, the connectors 86, 88 and 90 can be RJ-21 connectors for use in providing connections with corresponding connectors provided on cables such as 25-pair twisted pair cables.

Figure 2:
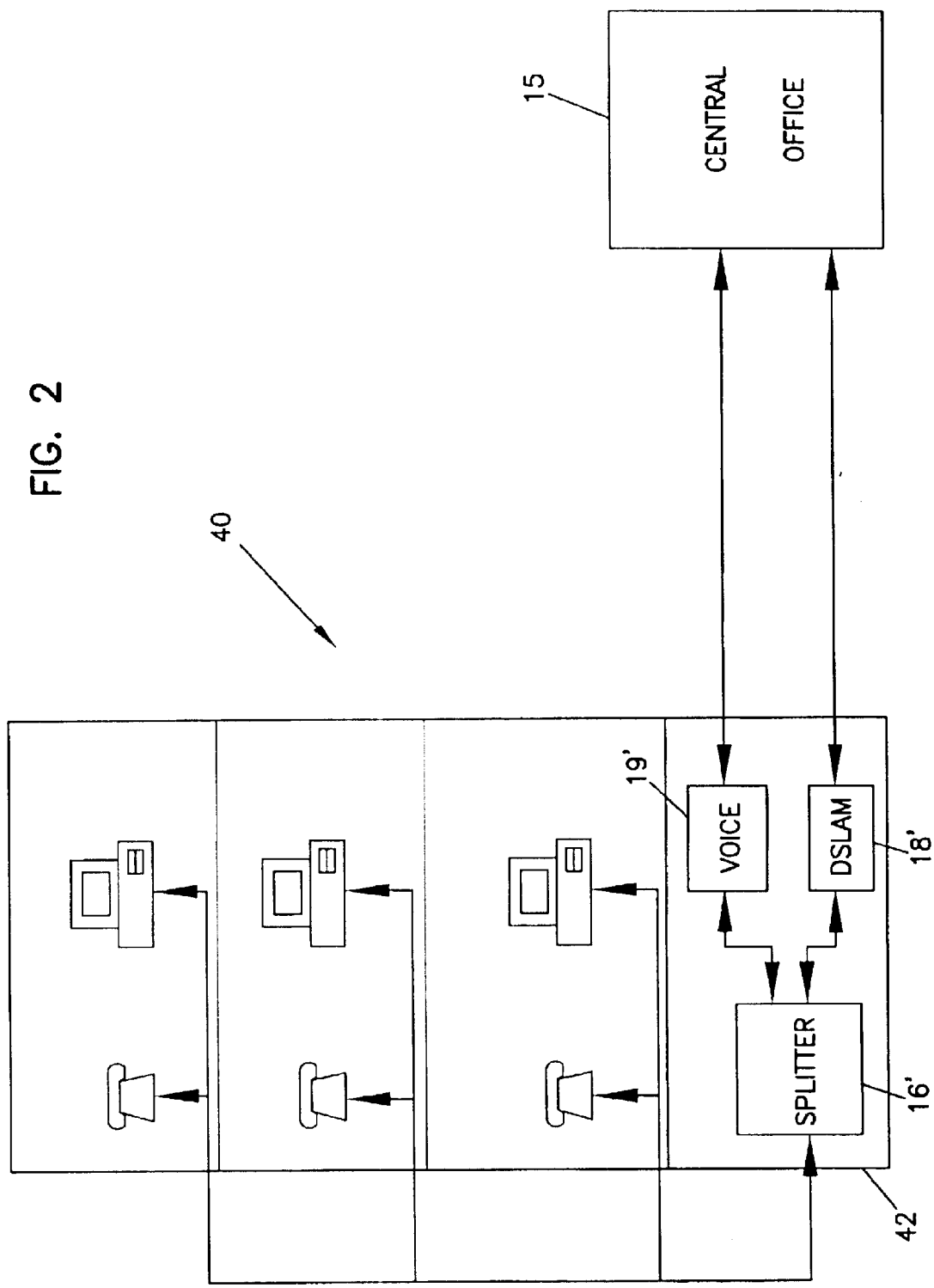
FIG. 2 is another diagram of a typical application of a telecommunications system including an MDF, a splitter device, a DSLAM, and a voice switch.

By way of example, the LINE connectors 86 can be used to provide interface locations for allowing the splitter unit 50 to interface with outside lines such as digital subscriber lines 13 or 13' (see FIGS. 1 and 2). The POTS connectors 88 can be used to provide interface locations for allowing the splitter unit 50 to interface with a voice switch such as voice switch 19 or 19' (see FIGS. 1 and 2). The DATA connectors 90 can be used to provide interface locations for allowing the splitter unit 50 to interface with a DSLAM such as DSLAM 18 or 18' (see FIGS. 1 and 2).

Referring to FIG. 5C, the front interface assembly 56 also includes a circuit board 96 mounted adjacent to the back side 84 of the front panel 58. In the embodiment of FIG. 5C, the circuit board 56 projects perpendicularly outward from the back side 84. However, it will be appreciated that in other embodiments, the circuit board 96 could be arranged at another orientation relative to the front panel 58 (e.g., the circuit board 96 could be parallel to the front panel 58).

Referring still to FIG. 5C, the circuit board 96 is preferably mechanically and electrically coupled to the connectors 86, 88 and 90. For example, the connectors 86, 88 and 90 can be right angle connectors having downwardly extending contact pins that are press fit within plated through holes defined by the circuit board 96 so as to provide both a mechanical and electrical connection between the circuit board 96 and the connectors 86, 88 and 90. Additionally, fasteners (e.g., screws or bolts) can be used to further fasten the connectors 86, 88 and 90 to the circuit board 96.

The circuit board 96 is shown mechanically coupled to the front panel 58 by a bracket 98. The bracket 98 is mechanically coupled to the circuit board 96 by one or more fasteners 100. The bracket 98 can also be used to electrically ground the circuit board 96 to the front panel 58. The phrase "mechanically coupled" means that one component is mechanically connected to another component either directly by techniques such as fasteners or adhesive, or indirectly through intermediate components such as brackets, flanges, etc.

As best shown in FIGS. 5A and 5C, the front panel 58 includes top and bottom rearward extensions 102 and 104 that project rearwardly from the front panel 58. The top rearward extension 102 is positioned above the circuit board 96 and the bottom rearward extension 104 is positioned below the circuit board 96. The rearward extensions 102 and 104 are configured to prevent a technician's fingers from contacting the electrical components of the circuit board 96.

As shown in FIGS. 5A and 5C, the front interface assembly 56 also includes first and second card edge connectors 106 and 108 mounted at a rear edge of the circuit board 96. As shown schematically in FIGS. 6A and 6B, the circuit board 96 electrically connects the first card edge connector 106 to the LINE and POTS connectors 86 and 88, and also electrically connects the second card edge connector 108 to the DATA connector 90.

As previously described, the front panel 58 of the front interface assembly 56 is configured to be removably connected to the front end 51 of the chassis 52. The phrase "removably connected" means that the front panel 58 can be relatively easily connected to and disconnected from the chassis 52 without requiring the chassis to be damaged and without requiring additional components of the chassis to be removed. The connection and disconnection of the front panel can be done with or without requiring a tool. As shown in FIG. 3, the removable connection is provided by threaded fasteners 74 in the form of thumbscrews that are threaded within fastener openings 72 of the mounting tab 70. Other types of fasteners such as clips, resilient fingers, and snap fit connections could also be used.

The first and second card edge connectors 106 and 108 are preferably female connectors and are used to provide an electrical connection between the circuit board 96 and the splitter card 54. For example, as shown schematically in FIGS. 6A and 6B, the splitter card 54 includes first and second card edge extensions 110 and 112 (i.e., male card edge connectors) that are respectively received within the first and second card edge connectors 106 and 108. The card edge extension 110 includes a pair of contacts 168b (e.g., contact pads) on the top side of the splitter card 54, and another pair of contacts 170b (e.g., contact pads) on the bottom side of the splitter card 54. When the first card edge extension 110 is inserted within the first card edge connector 106, the contacts 168b and 170b engage respective contacts 168a and 170a of the first card edge connector 106. The contacts 168a and 170a, are preferably opposing spring contacts that normally engage one another (i.e., the contacts are normally closed). When the first card edge extension 110 is inserted within the first card edge connector 106, the contacts 168a and 170a are forced apart and placed into engagement with the contacts 168b and 170b of the splitter card 54 to provide a connection thereinbetween.

Referring again to FIGS. 6A and 6B, the second card edge extension 112 of the splitter card 54 includes contacts 172 (e.g., contact pads) for providing a connection with the second card edge connector 108. For example, when the second card edge extension 112 is inserted into the second card edge connector 108, the contacts 172 engage respective contacts 174 provided at the second card edge connector 108 to provide an electrical connection thereinbetween. The contacts 174 are preferably normally open (i.e., no signals are passed through the contacts 174 unless the splitter card 54 is coupled to the circuit board 96).

Figure 6A:
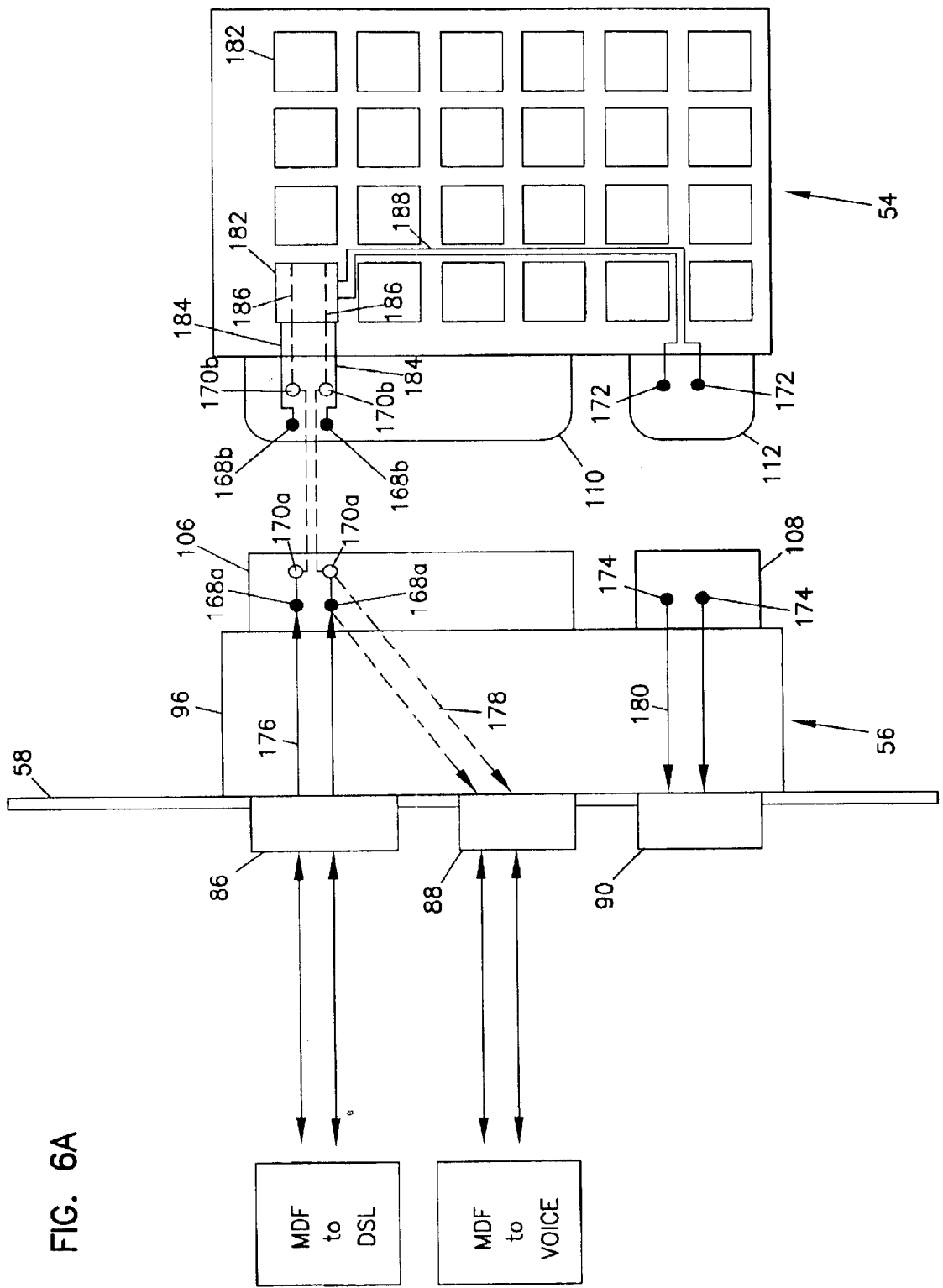
FIG. 6A is a schematic depiction of a circuit or channel of the splitter unit of FIG. 3, the circuit is shown with the splitter card disconnected from the front splitter assembly.
Figure 6B:
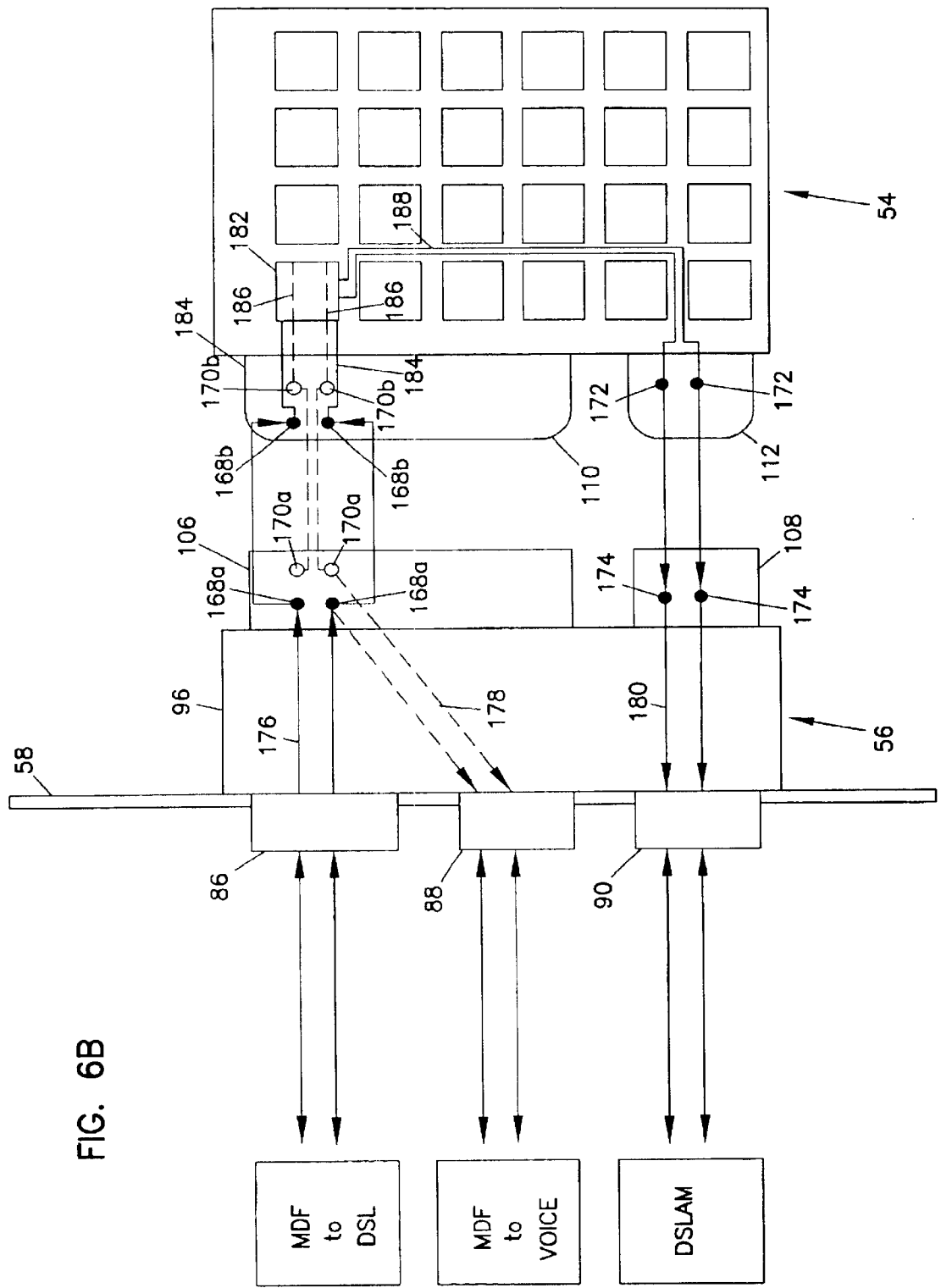
FIG. 6B shows the circuit of FIG. 6A with the splitter card electrically connected to the front interface assembly.

For clarity purposes, only one twisted pair circuit/channel for the splitter architecture is shown in FIGS. 6A and 6B. Thus, only single pairs of the contacts 168a, 168b, 170a, 170b, 172 and 174 are shown. However, it will be appreciated that the actual number of contacts provided will be dependent upon the capacity of the connectors 86, 88, and 90; and the number of splitters provided at the splitter card 54. For example, if the cable connectors 86, 88 and 90 comprise conventional 25 pair connectors, 24 separate pairs of the contacts 168a, 168b, 170a, 170b, 172 and 174 are preferably provided. In such a case, the twenty-fifth pair of conductors in the cable connectors is preferably grounded or inactive. Thus, in such an embodiment, the splitter architecture has the capacity to accommodate 24 separate twisted pair channels. Of course, the capacity of the splitter architecture 40 can be varied. For example, in certain embodiments it may be desirable to provide more or fewer splitters at the splitter card 54 (e.g., any number of splitters can be provided such as 8, 24, 48, 96, etc.).

Referring still to FIGS. 6A and 6B, the LINE connector 86 is connected to the pair of contacts 168a by first tracings 176; the pair of contacts 170a is connected to POTS connector 88 by second tracings 178; and the pair of contacts 174 is connected to DATA connector 90 by third tracings 180. Once again, for clarity and ease of explanation, the circuit pathway for only a single twisted pair signal has been illustrated in FIGS. 6A and 6B.

The splitter card 54 includes a plurality of splitters 182 (e.g., 24 splitters) such as POTS splitters or ISDN (Integrated Services Digital Network) filter circuits. The contacts 168b, 170b and 172 are shown connected to one of the splitters 182 by tracings. For example, tracings 184 connect the contacts 168b to the splitter 182, tracings 186 connect the contacts 170b to the splitter 182, and tracings 188 connect the contacts 172 to the splitter 182. While not shown for clarity purposes, it will be appreciated that similar contacts and tracings are provided for each of the twenty four splitters 82 shown in FIGS. 6A and 6B.

The splitters 182 of the splitter unit 50 can have a number of different configurations. For example, the splitters 182 can include conventional POTS splitter circuits. A conventional POTS splitter circuit functions to split a signal (e.g., a signal from a DSL) into two signals. One of the split signals is typically passed through one or more low pass filters capable of passing the relatively lower frequency voice content of the signal (e.g., less than about 4 kilohertz) and rejecting the signal content above the voice band (e.g., 30 kilohertz and above). This "voice-only" signal can then be transmitted from the splitter 182 to a voice switch such as voice switch 19 or 19'. The other split signal can be transmitted from the splitter 182 to a DSLAM such as DSLAM 18 or 18'. For such an embodiment, it is assumed that the DSLAM or other digital multiplexer that ultimately receives the composite signal will provide any required high-pass filter elements to remove the relatively low frequency voice signal content of the composite signal. In other embodiments, high pass filtration can be done at the splitter 182. It will further be appreciated that ISDN (Integrated Services Digital Network) filter circuits could also be used.

It will be appreciated that signals are transmitted bi-directionally through the splitters 82. Signals transmitted from DSLAMs and voice switches to the splitters 182 are combined at the splitters 182 such that the signals can be simultaneously routed to a subscriber 25, 25' through a single DSL 13, 13'.

FIGS. 6A and 6B show two modes of operation for the splitter unit 50. FIG. 6A shows the front interface assembly 56 in a normally closed mode in which the circuit board 96 is not connected to the splitter card 54. This might typically occur when a splitter card is being replaced or repaired. In such a mode, the contacts 168a engage contacts 170a such that a closed circuit is provided between the LINE connector 86 and the POTS connector 88. Because of the normally closed circuit, POTS signals can still be transferred to and from a DSL connected to the LINE connector 86 even when a splitter card is not coupled to the front interface assembly 56. In this manner, VOICE service is not interrupted and lifeline POTS and lifeline ISDN services (i.e., emergency 911 services) are maintained.

FIG. 6B schematically shows the splitter card 54 connected to front interface assembly 56. When the splitter card 54 is connected to the interface assembly 56, the normally closed contacts 168a, 170a are opened and placed into respective engagement with contacts 168b and 170b of the splitter card 54. Also, contacts 174 of the second card edge connector 108 are concurrently closed (i.e., the contacts 174 are placed into engagement with contacts 172 of the splitter card 54). Thus, a signal inputted through LINE connector 86 (e.g., from a subscriber through a DSL) will be transmitted from LINE connector 86 to the splitter 182 via tracings 176 and 184. At the splitter 182, the signal is preferably split and filtered such that a voice only signal is transmitted through tracings 186, and a data signal is transmitted through tracings 188. The voice only signal is transmitted from tracings 186 through contacts 170b and 170a to tracings 178. From tracings 178, the voice only signal is outputted from POTS connector 88 to a piece of equipment (e.g., a voice switch). The data signal is transmitted through contacts 172 and 174 to tracings 180. From tracings 180, the data signal is output through DATA connector 90 to a piece of equipment (e.g., a DSLAM). Signals traveling in the reverse direction through the splitter card 54 (i.e., signals input through the POTS and DATA connectors 88 and 90 from the voice switch and DSLAM) are combined at the splitters 54 and output through the LINE connector 86 (e.g., to a DSL).

It will also be appreciated that the depicted splitter card 54 is purely exemplary. In other embodiments, the configuration of the structure for providing an electrical interface with the front interface assembly 56 can be modified. For example, a single card edge extension and a single female card edge connector could be used. Other types of connectors such as wire wraps, punch-down (i.e., insulation displacement connector) could also be used.

To assemble the splitter unit 50, the card edge extensions 110 and 112 of the splitter card 54 can be inserted within the card edge connectors 106 and 108 of the front interface assembly 56 to provide an electrical connection between the components. After the splitter card 54 has been electrically connected to the front interface assembly 56, the splitter card 54 and the front interface assembly 56 can be inserted as a unit into the front end 51 of the chassis 52. During insertion, left and right edges of the splitter card 54 are directed into the opposing guide tracks 78. The unit is pushed rearwardly until the splitter card 54 is fully within the chassis 52 and the front panel 58 is substantially flush with the front end 51 of the chassis 52. Fasteners 74 are then used to secure the front panel 58 to the front end 51 of the chassis 52.

The splitter unit 50 can also be assembled by first inserting the splitter card 54 within the guide tracks 78 and then pushing the splitter card 54 rearwardly toward the back end 53 of the chassis 52. After the splitter card 54 has been inserted within the chassis 52, the front end interface assembly 56 can be mounted at the front end 51 of the chassis 52. To mount the front interface assembly 56 at the front end 51 of the chassis 52, the top and bottom rearward extensions 102 and 104 of the front panel 58 are inserted into the front end 51 of the chassis 52 and the front interface assembly 56 is pushed rearwardly until the card edge extensions 110 and 112 of the splitter card 54 are pressed within the card edge connectors 106 and 108 of the front interface assembly 56. During insertion of the front interface assembly 56, the top and bottom rearward extensions 102 and 104 help to guide the card edge connectors 106 and 108 into alignment with the card edge extensions 110 and 112.

With regard to the foregoing description, it is to be understood that changes may be made in detail without departing from the scope of the present invention. It is intended that the specification and depicted aspects of the invention may be considered exemplary, only, with a true scope and spirit of the invention being indicated by the broad meaning of the following claims.

What is claimed is:

1. A telecommunications device for mounting at least one splitter card, the device comprising:
    a chassis having an open front end for allowing the splitter card to be inserted into and removed from the chassis;
    a front interface assembly configured to be removably mounted at the front end of the chassis, the front interface assembly including:
        a front panel for at least partially enclosing the open front end of the chassis, the front panel being configured to be removably connected to the chassis, the front panel including a front side adapted to face away from the chassis and a back side adapted to face toward the chassis;
        first, second and third cable connectors mounted at the front panel, the first, second and third cable connectors being accessible from the front side of the front panel;
        a circuit board positioned adjacent the back side of the front panel;
        at least one card edge connector electrically connected to the first, second and third cable connectors by the circuit board, the card edge connector being configured to provide an electrical connection with the splitter card when the splitter card is inserted within the card edge connector, the card edge connector including normally closed contacts for closing electrical circuits between the first and second cable connectors when the splitter card is not inserted within the card edge connector.

2. The telecommunications device of claim 1, wherein the first connector is a LINE connector, the second connector is a POTS connector and the third connector is a DATA connector.

3. The telecommunications device of claim 1, wherein the first, second and third connectors are RJ-21 connectors.

4. The telecommunications device of claim 1, wherein the chassis is sized to receive a single splitter card.

5. The telecommunications device of claim 4, wherein the chassis includes opposing tracks for receiving edges of the single splitter card.

6. The telecommunications device of claim 1, wherein the circuit board is perpendicularly aligned relative to the front panel.

7. The telecommunications device of claim 6, wherein the card edge connector is mounted at a rear edge of the circuit board.

8. The telecommunications device of claim 7, wherein the front panel includes rearwardly extending top and bottom flanges that respectively extend above and below the circuit board.

9. The telecommunications device of claim 1, wherein the first, second and third connectors are mechanically coupled directly to the front panel and the circuit board.

10. The telecommunications device of claim 1, wherein the circuit board is mechanically coupled to the front panel.

11. The telecommunications device of claim 1, wherein the circuit board is mechanically coupled to the front panel by a bracket.

12. A telecommunications splitter device, the device comprising:
    a chassis having an open front end;
    a splitter card;
    a splitter card interface assembly including:
        a removable front panel for at least partially enclosing the open front end of the chassis, the front panel including a front side and a back side;
        first, second and third cable connectors mounted at the front panel, the first, second and third cable connectors being accessible from the front side of the front panel;
        a circuit board positioned adjacent the back side of the front panel; and
        at least one card edge connector electrically connected to the first, second and third cable connectors by the circuit board;
        the splitter card being electrically connected by the circuit board to the first, second and third connectors when the splitter card is inserted in the card edge connector;
        the card edge connector including normally closed contacts for closing electrical circuits between the first and second cable connectors when the splitter card is not inserted within the card edge connector; and
        the splitter card being mounted in the chassis by inserting the splitter card through the open front end of the chassis, and then enclosing the open front end of the chassis with the front panel.

13. The telecommunications splitter device of claim 12, wherein the splitter card include a plurality of POTS splitter circuits.

14. The telecommunications splitter device of claim 13, wherein the splitter card includes 24 POTS splitter circuits.

15. The telecommunications splitter device of claim 12, wherein the first connector is a LINE connector, the second connector is a POTS connector and the third connector is a DATA connector.

16. The telecommunications splitter device of claim 12, wherein the first, second and third connectors are RJ-21 connectors.

17. The telecommunications splitter device of claim 12, wherein the chassis is sized to receive a single splitter card.

18. The telecommunications splitter device of claim 17, wherein the chassis includes opposing tracks for receiving edges of the single splitter card.

19. The telecommunications splitter device of claim 12, wherein the circuit board is perpendicularly aligned relative to the front panel.

20. The telecommunications splitter device of claim 12, further comprising mounting flanges connected to the chassis adjacent the front end of the chassis.

* * * * *